(12) United States Patent
Rosenblum

(10) Patent No.: US 7,689,083 B1
(45) Date of Patent: Mar. 30, 2010

(54) HIGH SBS THRESHOLD OPTICAL FIBER

(75) Inventor: Steven S Rosenblum, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 20 days.

(21) Appl. No.: 11/605,924

(22) Filed: Nov. 28, 2006

(51) Int. Cl.
G02B 6/02 (2006.01)

(52) U.S. Cl. .................................. 385/123; 385/124

(58) Field of Classification Search .................... None
See application file for complete search history.

(56) References Cited

U.S. PATENT DOCUMENTS

| | | | | |
|---|---|---|---|---|
| 6,031,956 A * | 2/2000 | Li et al. | ...... | 385/124 |
| 6,754,424 B2 * | 6/2004 | Smith | ...... | 385/127 |
| 6,768,847 B2 * | 7/2004 | DiGiovanni et al. | ...... | 385/123 |
| 6,807,351 B2 * | 10/2004 | Hebgen et al. | ...... | 385/127 |
| 6,952,519 B2 * | 10/2005 | Bickham et al. | ...... | 385/127 |
| 7,046,891 B2 * | 5/2006 | Mishra et al. | ...... | 385/127 |
| 7,082,243 B2 | 7/2006 | Bickham et al. | ...... | 385/127 |
| 7,181,118 B2 | 2/2007 | Rosenblum et al. | ...... | 385/127 |
| 2006/0285809 A1 | 12/2006 | Bickham et al. | ...... | 385/123 |

OTHER PUBLICATIONS

Jen, Cheng-Kuei et al, "Acoustic Characterization of Silica Glasses", J. Am. Ceram. Soc. 76 [3], pp. 712-716, (1993).
Jeunhomme, Luc B., *Single-Mode Fiber Optics, Principles and Applications*, Second Edition, Revised and Expanded, pp. 39-44.
Kobyakov, Andrey et al, "Design concept for optical fibers with enhanced SBS threshold", Optics Express, vol. 13, No. 14, pp. 5338-5346, Jul. 11, 2005.
Kushibiki, Jun-ichi et al, "Ultrasonic microspectroscopy characterization of silica glass", Journal of Applied Physics, vol. 87, No. 6, pp. 3113-3121, Mar. 15, 2000.
Ruffin, A. Boh, "Brillouin gain analysis for fibers with different refractive indices", Optics Letters, vol. 30, No. 23, pp. 3123-3125, Dec. 1, 2005.
Wei, Ting-Cun, "Acoustic properties of silica glass doped with fluorine", Journal of Non-Crystalline Solids 321, pp. 126-133, 2003.

\* cited by examiner

*Primary Examiner*—Uyen-Chau N Le
*Assistant Examiner*—Mike Stahl
(74) *Attorney, Agent, or Firm*—Robert L. Carlson

(57) ABSTRACT

An optical fiber having at least a first central core segment, said central core segment comprising at least a first region having a width no more than 0.2 μm over a core delta % of 0.1 or greater. The first core region may also over a delta height of at least 0.15 delta % exhibits a profile volume less than 0.1. Such core segments can facilitate optical fibers which exhibit an L01 acousto-optic effective area which is greater in magnitude than the L02 acousto optic effective area.

14 Claims, 1 Drawing Sheet

US 7,689,083 B1

HIGH SBS THRESHOLD OPTICAL FIBER

BACKGROUND OF THE INVENTION

1. Field of the Invention

The present invention relates to high SBS threshold optical fibers.

2. Technical Background

Stimulated Brillouin Scattering (SBS) is a dominant non-linear penalty in many optical transmission systems. In many systems, it is desirable to transmit a large amount of optical power through optical fibers, while maintaining a high signal to noise ratio (SNR). However, as the optical signal power launched into an optical fiber increases, the launch power may exceed a certain threshold power (SBS threshold) and part of the optical signal power will then be reflected due to SBS as a backward propagating signal. Thus, due to SBS, a large amount of the signal power can be lost due to reflection back toward the transmitter. In addition, the scattering process increases the noise level at the signal wavelength. The combination of decrease in signal power and increase in the noise both lower the SNR and lead to performance degradation.

At finite temperatures, thermal excitations in glasses occur similarly to those of phonons in crystals, and the interaction of these vibrational modes with low intensity signal light produces spontaneous Brillouin scattering. As the intensity of the signal increases above a threshold the vibrations become coherent. This coherence is manifest through a density (acoustic) wave in the material that acts through electrostrictive coupling to create a Bragg grating on the incident field. The acoustic wave changes the refractive index and enhances the reflected light amplitude through Bragg diffraction. Above the SBS threshold level of an optical fiber, much of the incident light is converted into backward propagating photons, reducing the SNR.

SUMMARY OF THE INVENTION

One aspect of the present invention relates to an optical fiber comprising at least a first central core segment, said central core segment comprising at least a first region having a width no more than 0.2 μm over a core delta % of 0.1 or greater. The use of a region having such a thin spike-like refractive index profile region, causes the fiber to exhibit improved SBS threshold. The region preferably comprises a profile volume no more than 0.17 Δ %-μm², and more preferably a profile volume no more than 0.1 Δ %-μm², over a delta height of 0.15 Δ %. The region preferably also comprises a profile volume which is at least 0.030 Δ %-μm², more preferably at least 0.035 Δ %-μm². In another embodiment, the region comprises a profile volume which is no more than 0.17 Δ %-μm², more preferably no more no more than 0.1 Δ %-μm², and greater than 0.030 Δ %-μm², more preferably at least 0.035 Δ %-μm², and most preferably at least 0.037 Δ %-μm² over a radial width no more than 0.2 μm and a delta height of 0.15 Δ % The refractive index profile of the fiber preferably also employs a core having at least a second region; wherein the profile volume ratio between the first and second region is greater than 0.088, and wherein the outer radius of the first region is less than 1 micron from the fiber centerline. The second profile region is preferably below the first region and comprises a profile volume of at least 0.4, more preferably at least 0.45, and most preferably greater than 0.5. However, the invention is not limited to such second regions and the spike-like thin profile regions described herein can be used on virtually any refractive index profile to improve SBS threshold.

The use of a region having such a thin profile region, or spike, causes the fiber to exhibit greatly improved SBS threshold, it is believe due at least in part to the fact that the L02 acousto-optic effective area can be made to approach, and preferably be less than, the L01 acousto-optic effective area. Consequently, it is preferable to have the L02 acousto-optic effective area less than the L01 acousto-optic effective area. However, it is still preferred and possible using the designs and fiber profile components disclosed herein to design the fiber refractive index profile so that both the L01 and L02 acousto-optic effective areas are greater than 170 μm².

Another aspect of the present invention relates to an optical fiber comprising at least a first central core segment, said central core segment comprising a region at the top of the core segment comprising a region over a delta height of at least 0.15 delta % which exhibits a profile volume less than 0.1. The use of a region having such a thin profile region, or spike, causes the fiber to exhibit greatly improved SBS threshold. For example, using the fiber profiles disclosed herein SBS threshold greater than $11.6+\log[(1-e^{-(0.19)(50)/4.343})/(1-e^{-(\alpha)(L)/4.343})]$ dBm have been achieved.

The use of a region having such a thin profile region having a low profile volume over a relatively large delta space causes the fiber to exhibit greatly improved SBS threshold, it is believe due at least in part to the fact that the L02 acousto-optic effective area can be made to approach, and preferably be less than the L01 acousto-optic effective area. In preferred embodiments, the thin profile region causes the fiber to exhibit an L02 acousto-optic effective area which is less than the L01 acousto-optic effective area. However, it is still preferred and possible using the designs and fiber profile components disclosed herein to design the fiber refractive index profile so that both the L01 and L02 acousto-optic effective areas are greater than 170 μm².

Another aspect of the present invention relates to an optical fiber comprising a refractive index selected to result in the fiber exhibiting an L01 acousto-optic effective area which is greater in magnitude than the L02 acousto-optic effective area. In preferred embodiments, the L01 and L02 acousto-optic effective areas are both greater than 170 μm². Such relationships between the L01 and L02 acousto-optic effective areas can be achieved, for example by employing at least a first central core segment in the core refractive index profile, which exhibits a width no more than 0.2 μm over a core delta % of 0.1 or greater. Alternatively, such relationships between the L01 and L02 acousto-optic effective areas can be achieved by designing the optical fiber so that the refractive index profile comprises at least a first central core segment, said central core segment comprising a region at the top of the core segment comprising a delta height of at least 0.15 delta % which exhibits a profile volume less than 0.1.

Reference will now be made in detail to the present preferred embodiments of the invention, examples of which are illustrated in the accompanying drawings.

DETAILED DESCRIPTION OF THE EMBODIMENTS

Figure 1:
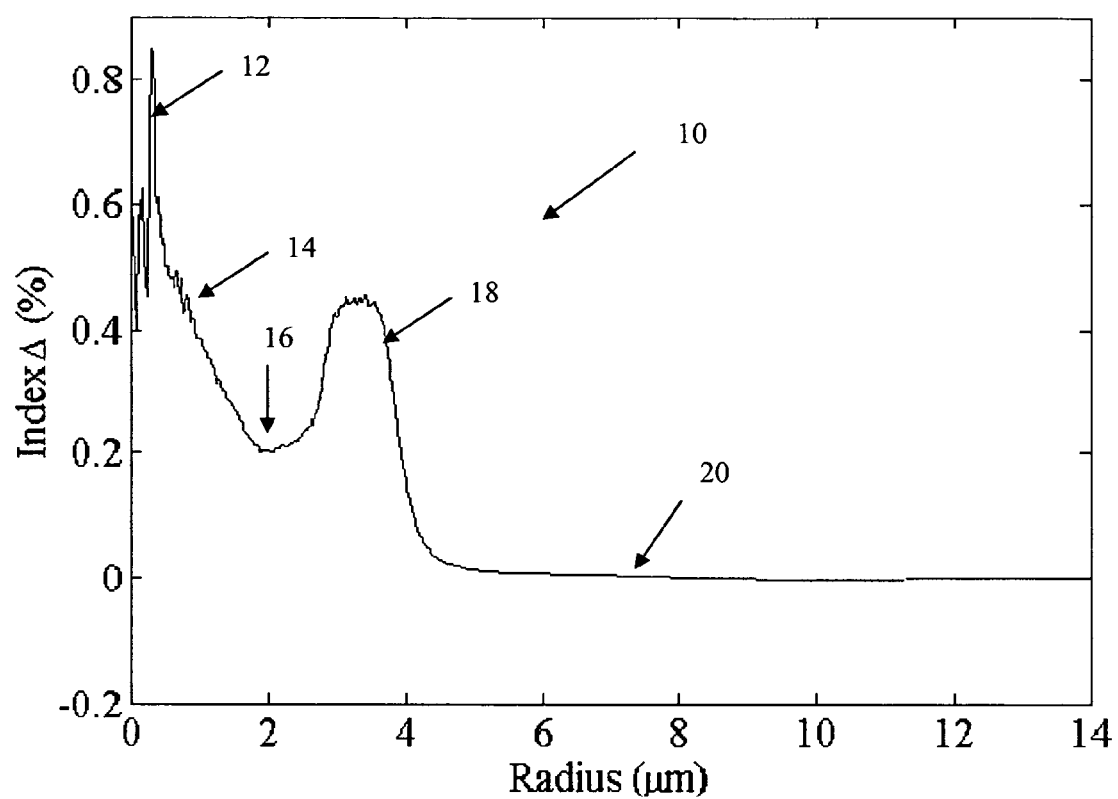
FIG. 1 illustrates the refractive index profile of an optical fiber in accordance with the present invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index. An "acoustic updopant" is herein considered to be a dopant which has the propensity to decrease the sound velocity relative to that of pure $SiO_2$. An "acoustic downdopant" is herein considered to be a dopant which has the propensity to increase the sound velocity relative to that of pure $SiO_2$. An acoustic updopant may be present in a region of an optical fiber having a sound velocity greater than that of $SiO_2$ when accompanied by one or more other acoustic dopants which are not acoustic updopants. Likewise, one or more other acoustic dopants which are not acoustic updopants may be present in a region of an optical fiber having a sound velocity less than that of $SiO_2$. An acoustic downdopant may be present in a region of an optical fiber having a sound velocity less than that of $SiO_2$ when accompanied by one or more other acoustic dopants which are not acoustic downdopants. Likewise, one or more other acoustic dopants which are not acoustic downdopants may be present in a region of an optical fiber having a negative relative refractive index. For example, both germania and fluorine dopants are acoustic updopants compared to pure undoped silica glass.

"Effective area" is defined as:

$$A_{eff}=2\pi(\int f^2(r)rdr)^2/(\int f^4(r)rdr)$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted. The profile volume is defined as $2\int\Delta\%rdr$.

The mode field diameter (MFD) is measured using the Peterman II method wherein, $2w=MFD$, and $w^2=(2\int f^2(r)rdr/\int [df(r)/dr]^2 rdr)$, the integral limits being 0 to $\infty$.

The bend resistance of a waveguide fiber can be gauged by induced attenuation under prescribed test conditions.

One type of bend test is the lateral load microbend test. In this so-called "lateral load" test, a prescribed length of waveguide fiber is placed between two flat plates. A #70 wire mesh is attached to one of the plates. A known length of waveguide fiber is sandwiched between the plates and a reference attenuation is measured while the plates are pressed together with a force of 30 newtons. A 70 newton force is then applied to the plates and the increase in attenuation in dB/m is measured. The increase in attenuation is the lateral load attenuation of the waveguide.

The "pin array" bend test is used to compare relative resistance of waveguide fiber to bending. To perform this test, attenuation loss is measured for a waveguide fiber with essentially no induced bending loss. The waveguide fiber is then woven about the pin array and attenuation again measured. The loss induced by bending is the difference between the two measured attenuations. The pin array is a set of ten cylindrical pins arranged in a single row and held in a fixed vertical position on a flat surface. The pin spacing is 5 mm, center to center. The pin diameter is 0.67 mm. During testing, sufficient tension is applied to make the waveguide fiber conform to a portion of the pin surface.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The effective fiber cutoff is lower than the theoretical cutoff due to losses that are induced by bending and/or mechanical pressure. In this context, the cutoff refers to the higher of the optical $LP_{11}$ and $LP_{02}$ modes. $LP_{11}$ and $LP_{02}$ are generally not distinguished in measurements, but both are evident as steps in the spectral measurement, i.e. no power is observed in the mode at wavelengths longer than the measured cutoff. The actual fiber cutoff can be measured by the standard 2 m fiber optical cutoff test, FOTP-80 (EIA-TIA-455-80), to yield the "fiber cutoff wavelength", also known as the "2 m fiber cutoff" or "measured cutoff". The FTOP-80 standard test is performed to either strip out the higher order modes using a controlled amount of bending, or to normalize the spectral response of the fiber to that of a multimode fiber.

Unless otherwise noted herein, optical properties (such as dispersion, dispersion slope, etc.) are reported for the LP01 mode.

When an optical wave propagates in an optical waveguide in which acoustic modes are present, the frequency of the scattered light is determined by phase and wave-vector matching conditions:

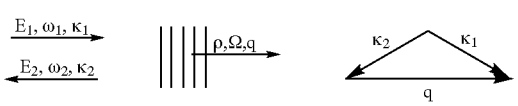

where $E_1$ and $E_2$ are electrical fields of the incident and reflected optical waves, respectively, $\omega_1$ and $\omega_2$ are the respective frequencies, $\kappa_1$ and $\kappa_2$ are the respective optic wave vectors, $\rho$ is material density, $\Omega$ is acoustic frequency, and q is acoustic wave vector.

The phase matching conditions are:

$$\omega_1=\omega_2+\Omega$$

$$q=\kappa_1-\kappa_2$$

$$|q|=\kappa_1+\kappa_2\cong 2\kappa_1$$

The Brillouin frequency is:

$$\Omega = |q|v$$

$$\Omega = 2nv/\lambda$$

v is the velocity of sound and the Brillouin frequency for bulk silica is around 11 GHz at 1550 nm.

The electric fields that describe 3-dimensional Brillouin scattering are:

Incident field: $\tilde{E}_1(z,t) = f(r)A_1(z,t)\exp[i(k_1z-\omega_1 t)] + c.c.$ Reflected field: $\tilde{E}_2(z,t) = f(r)A_2(z,t)\exp[i(k_2z-\omega_2 t)] + c.c.$ where $f(r)$ is the transverse component of the electric field corresponding to the fundamental mode field and $A_1(z,t)$ is the envelope of the electric field. The term "c.c." denotes the complex conjugate of the first term. The material density change can be represented by:

$$\tilde{\rho}(r,\theta,t,z) = \rho_0 + \Sigma_n a_n f_a^n(r,\theta)\exp[i(q_n z - \Omega_n t)] + c.c.$$

where $q_n$ is the wave number, $\rho_0$ is the mean material density, and $\Omega_n$ is the acoustic frequency of the acoustic mode $L_{01}$ and where c.c. is the complex conjugate. For the material density change, the sum is over "n" weakly guided acoustic modes, and $f_n^a(r)$ is the acoustic envelope function, and $a_n$ is the modal coefficient for mode "n". The material density obeys the acoustic wave equation represented by:

$$\frac{\partial^2 \tilde{\rho}}{\partial t^2} - \Gamma' \nabla^2 \frac{\partial \tilde{\rho}}{\partial t} - v^2(r)\nabla^2 \tilde{\rho} = -\frac{\gamma_e \nabla^2 \langle E^2 \rangle}{8\pi}$$

where $\Gamma'$ is the damping parameter, $\gamma_e$ is the electrostrictive constant and v is the velocity of sound.

The acoustic field is then given by $$\tilde{\rho}(r,t,z) = k\left(\sum_n b_n f_n^a(r)\right) A_1 A_2^* \exp[i(qz - \Omega t)]$$

$$k\rho_a(r) A_1 A_2^* \exp[i(qz - \Omega t)]$$

$$b_n = \int\int f^2(r) f_n^a(r) r dr d\phi$$

$$k = \frac{-i\gamma_e}{8\pi} \frac{q^2}{(i\Gamma - \Omega)\Gamma}$$

where $f_n^a(r)$ is the transverse component of the acoustic mode, $L_{0n}$, k is a constant proportional to electrostriction coefficient of the fiber, and $\rho_a(r)$ is the total transverse component of the acoustic field.

The refractive index change caused by the acoustic field is approximately proportional to the amplitude of the acoustic field: $\Delta n \propto \tilde{\rho}$, and using standard perturbation theory, the change in the propagation constant is $$\Delta\beta = \frac{k_0 \int_0^\infty \Delta n|f(r)|^2 r dr}{\int_0^\infty |f(r)|^2 r dr}$$

$$= \frac{-k_0 n_{2eff}}{A_{eff}^{acoust}} A_1 A_2^* \exp[i(qz - \Omega t)] + c.c$$

The nonlinear and effective Kerr coefficients for this process are:

$$\gamma = \frac{2\pi n_{2eff}}{\lambda A_{eff}^{acoust}} \quad n_{2eff} = \frac{-i\gamma_e^2 q^2}{4(4\pi)^3 \rho_0 n(i\Gamma - \Omega)\Gamma}$$

where the acousto-optic effective area of $L_{0n}$ mode is defined as:

$$A_{eff}^{ac} = \frac{2\pi\left[\int_0^\infty [f(r)]^2 r dr\right]^2}{b_n^2} \int_0^\infty (f_n^a(r))^2 r dr$$

Values for the acousto-optic effective area are calculated at the Brillouin frequency of the optical fiber.

The optical effective area is:

$$A_{eff}^{optical} = \frac{2\pi\left[\int_0^\infty f^2(r) r dr\right]^2}{\int_0^\infty f^4(r) r dr}$$

These two effective areas have the same numerator, but the denominator of the acousto-optic effective area is a measure of the overlap between the acoustic and optical fields. Since this overlap term is in the denominator, a small overlap leads to a large acousto-optic effective area.

In practice, the (optical) refractive index profile is often described by the optical delta profile (optical refractive index delta profile) or delta % (Δ %). We can also similarly define the delta for the acoustic refractive index so that each optical refractive index profile is also associated with a corresponding acoustic delta profile that describes the acoustic behavior of longitudinal acoustic field. Using the index definitions for the optical and acoustic waves, we can describe the optical delta profile and acoustic Delta Profiles using the following equation:

$$\Delta_o = \frac{n_o^2(r) - n_{oc}^2}{2n_o^2(r)} \times 100\%,$$

$$\Delta_a = \frac{n_a^2(r) - n_{ac}^2}{2n_a^2(r)} \times 100\%$$

Where subscript "o" stands for optical wave and a stands for acoustic wave, and c" denotes the index for the cladding.

We have designed waveguides with robust optical properties and large acousto-optic effective areas. Measurements of a large number of fabricated optical fibers have verified the connection between acousto-optic effective area and the SBS gain factor.

An optical waveguide fiber which is optically single-moded at a particular wavelength may be multi-moded acoustically at the same optical wavelength (assuming λ=1.55 μm) because the acoustic wavelength corresponding to Brillouin frequency is of the order of 0.55 microns, which is quite small compared to typical optical waveguide fiber dimensions. In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustic modes is preferably reduced via the refractive (i.e., optical) and acoustic index profiles of the optical fiber disclosed herein. In some embodiments, optical mode field remains extended while acoustic fields become more tightly confined to one region of the core to reduce overlap between the optical mode field and the acoustic fields. In some embodiments the confinement of acoustic power in the core is reduced by spreading the acoustic field, which is achieved by matching the acoustic velocity in the core and cladding (i.e., making theses velocities the same or essentially the same).

Thus, in some of the embodiments of the present invention, the optical fiber disclosed herein tends to pull the mode field of the dominant acoustic mode field (for example, $L_{01}$) either (a) in toward the centerline of the optical fiber, or (b) outward towards the edge of the core, resulting in reduced coupling between the acoustic and optical fields. Preferably, the optical fiber also tends to pull the mode field of the next dominant acoustic mode field (typically $L_{02}$) either (a) in toward the centerline of the optical fiber, or (b) outward towards the edge of the core, resulting in reduced coupling between this next dominant acoustic mode field and the optical field.

The Brillouin frequency for optical fiber as disclosed herein is preferably between about 9.5 to 12 GHz, for the 1550 nm wavelengths (and is higher when measured at shorter wavelengths).

The optical fiber disclosed herein comprises a core and a cladding layer (or cladding) surrounding and directly adjacent the core. The cladding has a refractive index profile, $\Delta_{CLAD}(r)$. Preferably, $\Delta_{CLAD}(r)=0$ throughout the cladding. The core comprises a refractive index profile, $\Delta_{CORE}(r)$. The core has a maximum relative refractive index, $\Delta_{MAX}$, in %, occurring at a radius $r_{\Delta MAX}$. In preferred embodiments, the core is comprised of a plurality of core portions, each having respective refractive index profiles, for example $\Delta_{CORE1}(r)$, $\Delta_{CORE2}(r)$, and so on. Each core portion may have a maximum relative refractive index for that core portion, i.e. a local maximum, reported in %, for example $\Delta_{1MAX}$ for a first core portion, $\Delta_{2MAX}$ for a second portion, and so on. Likewise, a core portion may have a minimum relative refractive index, such as $\Delta_{2MIN}$, etc. A maximum or minimum relative refractive index may occur at a particular radius, such as $r_{\Delta 1MAX}$ or $r_{\Delta 2MIN}$ and so on. For the embodiments disclosed herein, the core is defined herein to end at a radius $r_{CORE}$.

Preferably, the core is comprised of silica doped with germanium, i.e. germania doped silica. Doping of the core, and in particular the central portion of the core, advantageously reduces sound velocity in the optical fiber core relative to its cladding, resulting in total internal reflection of the acoustic field. Dopants other than germania, singly or in combination, may be employed within the core, and particularly at or near the centerline, of the optical fiber disclosed herein to obtain the desired refractive index and density. Although high refractive index values (or high levels of updopant) tend to bring the acoustical mode field toward the centerline, such values also tend to decrease the optical effective area. In preferred embodiments, the core of the optical fiber disclosed herein has a non-negative refractive index profile, more preferably a positive refractive index profile, wherein the core is surrounded by and directly adjacent to a cladding layer.

One example of an optical fiber refractive index profile utilizing a thin profile region in accordance with the invention is illustrated in FIG. 1. In the embodiment illustrated in FIG. 1, the optical fiber exhibits a core 10 having a refractive index profile and a centerline, the core comprising a first central region 12 having a maximum relative refractive index $\Delta_{1MAX}$, a second central region 14 surrounding and directly adjacent to the first central region and having maximum relative refractive index $\Delta_{2MAX}$, an intermediate region 16 surrounding and directly adjacent the central region, the intermediate region 16 having a minimum relative refractive index $\Delta_{3MIN}$, and an outer annular region 18 surrounding and directly adjacent the intermediate region, the outer annular region 18 having a maximum relative refractive index $\Delta_{4MAX}$, wherein $\Delta_{1MAX}>\Delta_{2MAX}>\Delta_{3MIN}$ and $\Delta_{4MAX}>\Delta_{3MIN}$; and a cladding layer 20 surrounding and directly adjacent the core.

Thus, in the embodiment illustrated, first central region exhibits a width no more than 0.2 μm over a core delta % of 0.1 or greater. Such a thin profile region, or profile spike, in accordance with the invention, results in the fiber exhibiting significantly improved SBS. Region 12 also exhibits a profile volume less than 0.1. over a delta height of at least 0.15 delta %. For example, the embodiment illustrated in FIG. 1 exhibits a profile volume of 0.31 over a delta height of 0.15. The use of a region having such a thin profile region, or spike, causes the fiber to exhibit improved SBS. For example, using the fiber profiles disclosed herein SBS threshold greater than $11.6+\log[(1-e^{-(0.19)(50)/4.343})/(1-e^{-(\alpha)(L)/4.343})]$ dBm, more preferably greater than $11.8+\log[(1-e^{-(0.19)(50)/4.343})/(1-e^{-(\alpha)(L)/4.343})]$ dBm, and most preferably greater than $12.3+\log[(1-e^{-(0.19)(50)/4.343})/(1-e^{-(\alpha)(L)/4.343})]$ dBm have been achieved. It should be understood, however, that the use of such thin profile regions such as region 12 in accordance with the invention is not limited to profiles such as that disclosed in FIG. 1, and in fact can be employed on any fiber profile. In the embodiment illustrated, first central region 12 exhibits an alpha of about 0.3, and second central region 14 exhibits an alpha of about 0.8. Thus, in the embodiment illustrated in FIG. 1, the central core region exhibits a central region 12 having a first alpha and another region 14 surrounding a second alpha and the first alpha is less than 0.5 and said second alpha is greater than 0.5, and the difference between the first and second alphas is greater than 0.2.

In some preferred embodiments, such as illustrated in FIG. 1, the first central core region 12 is spaced from the centerline of the optical fiber. For example, in some embodiments, the peak refractive index of the thin spike-like first core region may be spaced from the centerline of the optical fiber a distance greater than 0.1 or even greater than 0.15 μm. Also in some preferred embodiments, the first central core region is located so that the outer radius of the central core region is less than 2 microns, more preferably less than 1 micron from the centerline of the optical fiber.

The use of a region 12 having a thin profile region, or spike, causes the fiber to exhibit greatly improved SBS threshold. Region 12 preferably comprises a profile volume no more than 0.17 Δ %-μm², and more preferably a profile volume no more than 0.1 Δ %-μm², over a delta height of 0.15. It is believed that the SBS threshold is due at least in part to the fact that the L02 acousto-optic effective area can be made to be less than the L01 acousto-optic effective area. Consequently, it is preferable to have the L02 acousto-optic effective area less than the L01 acousto-optic effective area. However, it is still preferred and possible using the designs and fiber profile spikes disclosed herein to design the fiber refractive index profile so that both the L01 and L02 acousto-optic effective areas are greater than 170 μm² at 1550 nm. In the embodiment illustrated in FIG. 1, the L01 acousto-optic effective area is about 236 μm² at 1550 nm and the L02 acousto-optic effective area is about 188 μm² at 1550 nm Preferably, the refractive index of the core of the optical fiber is selected to provide an absolute SBS threshold in dBm greater than about 1.6+log $[(1-e^{-(0.19)(50)/4.343})/(1-e^{-(\alpha)(L)/4.343})]$. Preferably, the refractive index of the core is selected to provide an optical effective area at 1550 nm greater than 80 μm². Preferably, the refractive index of the core is selected to provide a zero dispersion wavelength below 1400 nm. Preferably, the refractive index of the core is selected to provide a dispersion of greater than 15 ps/nm-km at a wavelength of 1550 nm. Preferably, the refractive index of the core is selected to provide a dispersion slope at 1550 nm of less than 0.07 ps/nm²-km. In preferred embodiments, $\Delta_{1MAX}$>0.7 Δ %, $\Delta_{2MAX}$>0.4%. Preferably, the absolute SBS threshold in dBm greater than about 10.8+log $[(1-e^{-(0.19)(50)/4.343})/(1-e^{-(\alpha)(L)/4.343})]$. Preferably, the refractive index of the core of the optical fiber is selected to provide an attenuation at 1550 nm less than 0.23 dB/km, more preferably less than 0.22 dB/km, even more preferably less than 0.21 dB/km, still more preferably less than 0.2 dB/km.

Preferably, $\Delta_{1MAX}$>0, $\Delta_{3MAX}$>0, $\Delta_{2MIN}$>0 and $\Delta_{3MIN}$>0. Preferably, the refractive index of the entire core relative to the cladding is greater than 0.

In one subset of embodiments, $\Delta_{1MAX}$ and $\Delta_{2MAX}$ are greater than $\Delta_{3MAX}$. Preferably, $\Delta_{2MAX}-\Delta_{3MIN}$>0.25%, $\Delta_{3MIN}$<0.4%, and more preferably $\Delta_{3MIN}$ is between 0.1 and 0.4%. In some preferred embodiments, $\Delta_{3MIN}$ is between 0.1 and 0.3%. In other preferred embodiments, $\Delta_{3MIN}$ is between 0.2 and 0.3%.

Preferably, $\Delta_{4MAX}-\Delta_{3MIN}$>0.10%. In preferred embodiments, $\Delta_{2MAX}$>0.4%, $\Delta_{2MAX}-\Delta_{3MIN}$>0.25%, $\Delta_{3MIN}$ is between 0.1 and 0.4%, and $\Delta_{4MAX}-\Delta_{3MIN}$>0.10%.

In preferred embodiments, the absolute SBS threshold in dBm is greater than about 9.5+log $[(1-e^{-(0.19)(50)/4.343})/(1-e^{-(\alpha)(L)/4.343})]$.

In some preferred embodiments, the optical effective area at 1550 nm is greater than 90 μm². In other preferred embodiments, the optical effective area at 1550 nm is greater than 100 μm². In preferred embodiments, optical fibers such as those illustrated and discussed herein (e.g. as shown in FIG. 1) preferably have: a dispersion at 1550 nm of greater than 15 ps/nm-km, more preferably between 15 and 21 ps/nm-km, even more preferably between 15 and 17 ps/nm-km; a dispersion slope at 1550 nm of less than 0.07 ps/nm²-km, more preferably between 0.05 and 0.07 ps/nm²-km; kappa between 230 and 290 nm; dispersion zero wavelength less than 1400 nm, more preferably less than 1340 nm, even more preferably between 1310 and 1340 nm, still more preferably between 1320 and 1340 nm; an optical effective area at 1550 nm greater than 90 μm², more preferably between 90 μm² and 100 μm²; an optical mode field diameter at 1550 nm of greater than 10 μm, preferably between 10 and 11 μm; pin array bend loss at 1550 nm less than 20 dB, more preferably less than 15 dB, even more preferably less than 10 dB; a dispersion at 1310 nm having a magnitude less than 5 ps/nm-km, more preferably less than 3 ps/nm-km; and a dispersion slope at 1310 nm of less than 0.10 ps/nm²-km. Preferably, the attenuation at 1550 nm is less than 0.2 dB/km, more preferably less than 0.195 dB/km, even more preferably less than 0.190 dB/km, and still more preferably less than 0.188 dB/km. Preferably, the core has an alpha-profile with an α<1, more preferably with an α between 0.5 and 1. Still more preferably, the core has at least two core regions as discussed herein, at least one of the core regions comprising a thin spike-like core region as discussed herein. Preferably the two core regions exhibit distinctly different alphas, and more preferably the difference between the alphas of the two core regions is greater than 0.2. In some embodiments, it is preferably for the alpha of one of the core regions is less than 0.5, and the alpha of the other of the core regions exhibit is greater than 0.5. Most preferably, both of the regions exhibit an α<1.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising at least a first central core segment, said central core segment comprising at least a first region comprising an inner radius r1 and an outer radius r2 wherein r2−r1 is less than or equal to 0.2 μm at every point over a core delta % of 0.1 or greater when the core delta % at r1 is equal to that at r2; wherein the region further comprises peak core delta % at a radius between r1 and r2 and a profile volume of at least 0.030 and no more than 0.17 Δ%-μm² over a delta height of 0.15.

2. The optical fiber of claim 1, wherein said region comprises a profile volume of at least 0.035 and no more than 0.1 Δ%-μm².

3. The optical fiber of claim 1, wherein said region comprises a width no more than 0.2 μm over a core delta % of 0.2 or greater.

4. The optical fiber of claim 1, further comprising at least a second core region in said central core segment which comprises a profile volume of at least 0.40 Δ%-μm².

5. The optical fiber of claim 1, wherein the L02 acousto-optic effective area is less than the L01 acousto-optic effective area.

6. The optical fiber of claim 1, wherein the L01 and L02 acousto-optic effective areas are both greater than 170 μm².

7. The optical fiber of claim 1, wherein the outer radius of the first region is within 1 micron from the fiber centerline.

8. The optical fiber of claim 1, wherein the core segment further comprises a region on the centerline of the fiber having a refractive index lower than the peak refractive index of the core segment.

9. The optical fiber of claim 1, wherein the core segment further comprises a second core region having a peak refractive index lower than that of the peak refractive index of the first core region and wherein the second core region comprises a peak delta between about 0.18 and 0.45.

10. The optical fiber of claim 9, wherein the peak refractive index of the first core region is spaced from the centerline of the optical fiber a distance greater than 0.15 μm.

11. An optical fiber comprising at least a first central core segment, said central core segment comprising a region at the top of the core segment comprising a region over a delta height of at least 0.15 delta % which exhibits a profile volume less than 0.1 Δ%-μm², said profile volume calculated between the inner radial and outer radial limits of the core segment, and wherein said optical fiber exhibits an L02 acousto-optic effective area lower than L01 acousto-optic effective area wherein said region exhibits a first alpha and at least one other portion of the core segment exhibits a second alpha and the first alpha is less than 0.5 and said second alpha is greater than 0.5.

12. The optical fiber of claim 11, wherein the core segment comprises a region over a delta height of 0.2 delta % exhibiting a profile volume less than 0.172 $\Delta\%\text{-}\mu m^2$.

13. An optical fiber comprising at least a first central core segment, said central core segment comprising a region at the top of the core segment comprising a region over a delta height of at least 0.15 delta % which exhibits a profile volume less than 0.1 $\Delta\%\text{-}\mu m^2$, wherein said region exhibits a first alpha and at least one other portion of the core segment exhibits a second alpha and the first alpha is less than 0.5 and said second alpha is greater than 0.5.

14. The optical fiber of claim 13, wherein the difference between the first and second alphas is greater than 0.2.

* * * * *